United States Patent

Kawagoe et al.

Patent Number: 5,274,921
Date of Patent: Jan. 4, 1994

[54] FORMING METHOD OF BUSHING WITH OUTER SLIDING SURFACE

[75] Inventors: Hideharu Kawagoe; Takayuki Shibayama; Yoshitaka Kondo, all of Nagoya; Motoji Komori, Gifu, all of Japan

[73] Assignee: Daido Metal Company Ltd., Nagoya, Japan

[21] Appl. No.: 984,546

[22] Filed: Dec. 2, 1992

[30] Foreign Application Priority Data

Feb. 7, 1992 [JP] Japan .................................. 4-022224

[51] Int. Cl.⁵ ........................ B21D 19/00; B21D 53/10
[52] U.S. Cl. ........................ 29/898.059; 29/898.057; 72/355.4; 72/368; 72/378; 72/700
[58] Field of Search ............ 29/898.054, 898.056, 29/898.057, 898.058, 898.059; 72/344, 352, 355.4, 368, 377, 378, 700

[56] References Cited

U.S. PATENT DOCUMENTS

| | | | |
|---|---|---|---|
| 2,198,074 | 4/1940 | Berry | 29/898.059 |
| 2,289,572 | 7/1942 | Underwood | 29/898.059 X |
| 2,338,858 | 1/1944 | Lignian | 29/898.058 |
| 2,722,047 | 11/1955 | Cousino | 29/898.056 |
| 4,048,703 | 9/1977 | Lehnhart | 29/898.057 |
| 4,122,701 | 10/1978 | Lehnhart | 72/355.4 |

FOREIGN PATENT DOCUMENTS

| | | | |
|---|---|---|---|
| 1185900 | 1/1965 | Fed. Rep. of Germany | 72/367 |
| 137412 | 9/1979 | Fed. Rep. of Germany | 72/367 |
| 732249 | 6/1955 | United Kingdom | 29/898.058 |

Primary Examiner—Mark Rosenbaum
Assistant Examiner—S. Thomas Hughes
Attorney, Agent, or Firm—Browdy and Neimark

[57] ABSTRACT

A bushing having an outer sliding surface is produced by a die forming method without machining. A crowning shape is provided to the outer surface so that the outer diameter of the bushing is smaller at its opposite longitudinal ends, and increases progressively toward a central zone of the bushing. A cylindrical bushing blank is fitted on distal end portion of a vertically-movable mandrel. Next, one of an upper die and a lower die is reactively moved toward the other to plastically work the bushing blank by the both dies and the mandrel, thereby working the bushing. An inner diameter of the upper die is larger at its lower end, and decreases progressively away from the lower end, and an inner diameter of the lower die is larger at its upper end, and decreases progressively away from the upper end.

3 Claims, 3 Drawing Sheets

FORMING METHOD OF BUSHING WITH OUTER SLIDING SURFACE

BACKGROUND OF THE INVENTION

This invention relates to a method of forming or shaping a bearing bushing used in various kinds of machines, such as an automobile, an industrial machine and an agricultural machine, and more particularly to a bushing (whose outer peripheral surface serves as a sliding surface) used in that portion of such a machine which is liable to receive an impact load and an uneven load.

A bushing whose outer peripheral surface is used as a sliding surface is already known. There are known methods of providing a crowning shape to an outer peripheral surface of a bushing so that the outer diameter of the bushing is smaller at its opposite longitudinal ends, and increases progressively toward the longitudinal central zone of the bushing. In one such known method, those portions of an outer peripheral surface of a bushing disposed adjacent to opposite ends thereof are machined to impart a crowning shape to the outer peripheral surface.

For example, a bushing, mounted as a bearing member in a shock absorber provided at a front fork of a motorcycle, receives an impact at the time of start of the motorcycle, and also is greatly influenced by undulations on the road during running of the motorcycle. Namely, due to vibrations transmitted via wheels at the time of the start and during the running, as well as bending of an inner tube (or a shaft) supporting the bushing, and bending of an outer tube slidable relative to the outer peripheral surface of the bushing, an impact load and an uneven load act on the outer peripheral surface (sliding surface) of the bushing at the ends of the bushing. Therefore, it is necessary that this sliding surface of the bushing should be formed into a crowning shape so that the impact load and the uneven load can be absorbed or alleviated.

In the method of providing the crowning shape to the outer peripheral surface of the bushing by machining the time required for the machining is relatively long, and therefore an enhanced productivity can not be expected. And besides, chips produced by machining deposit on the sliding outer peripheral surface of the bushing, and may damage the sliding inner peripheral surface of the outer tube held in sliding contact with the outer sliding surface of the bushing.

SUMMARY OF THE INVENTION

Thus, it is an object of this invention to provide a bushing forming method which overcomes the above deficiencies of the prior art, and can efficiently produce a bushing inexpensively.

According to the present invention, there is provided a bushing forming method wherein a crowning shape is provided to an outer peripheral surface of a bushing so that the outer diameter of the bushing is smaller at its opposite longitudinal ends, and increases progressively toward a longitudinal central zone of the bushing, the outer peripheral surface serving as a sliding surface, the method comprising the steps of:

(a) fitting a cylindrical bushing blank on a vertically-movable mandrel;

(b) bringing an upper- and a lower-dies being coaxial with said mandrel to relatively approach each other as to plastically deform said bushing blank between said upper- and lower-dies and said mandrel, an inner diameter of said upper die being larger at its lower end and decreasing progressively away from said lower end, and an inner diameter of said lower die being larger at its upper end and decreasing progressively away from said upper end; and (c) moving said upper- and lower-dies relative to said mandrel to remove the bushing from said dies.

Herein, the terms "upper" and "lower" are used merely to indicate the relative positional relationship between the two dies by way of example, and are not intended to limit the direction of the dies.

Preferably, the cylindrical bushing blank comprises a backing metal of an inner peripheral layer (which is made of steel, for example) and an outer peripheral layer of a bearing alloy layer formed on an outer side of the backing metal. In usual, the inner backing metal and the outer bearing alloy layer are integrally bonded together through an intermediate bonding metal layer by rolling. Typically, a steel sheet and a bearing alloy sheet are superposed together with an intermediate bonding metal sheet interposed therebetween, and the superposed sheets are rolled into an integral structure. Then, the obtained laminate is cut into a predetermined size, and then is bent or curled into a cylindrical shape with opposite ends butted together, thereby producing a bushing blank (which is usually referred to as "cylindrically-bent bushing").

DESCRIPTION OF THE PREFERRED EMBODIMENTS

A preferred embodiment of the present invention will now be described with reference to FIGS. 1 to 3.

Figure 1:
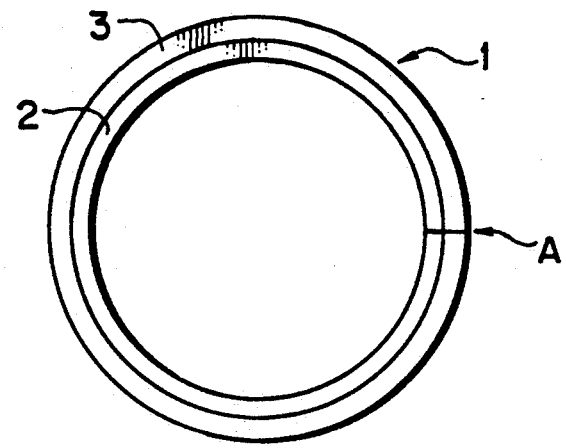
FIG. 1 is an end view of a cylindrical bushing blank.
Figure 2:
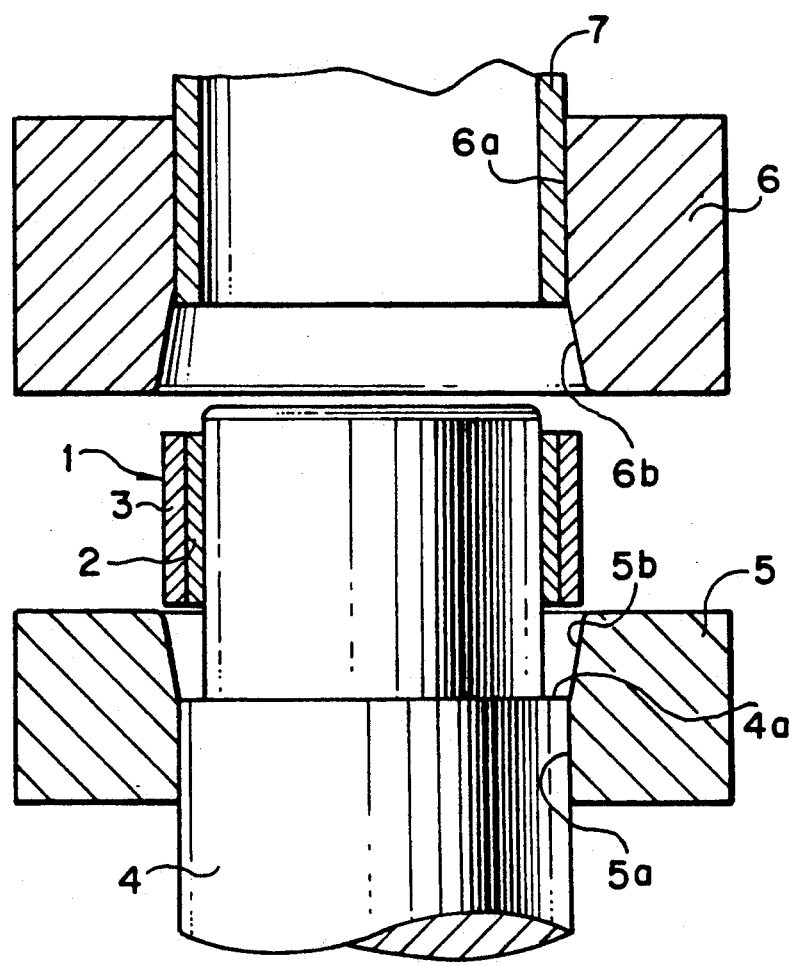
FIG. 2 is a cross-sectional view of a forming apparatus, showing a forming operation-ready condition in which the cylindrical bushing blank is attached to a mandrel.
Figure 3:
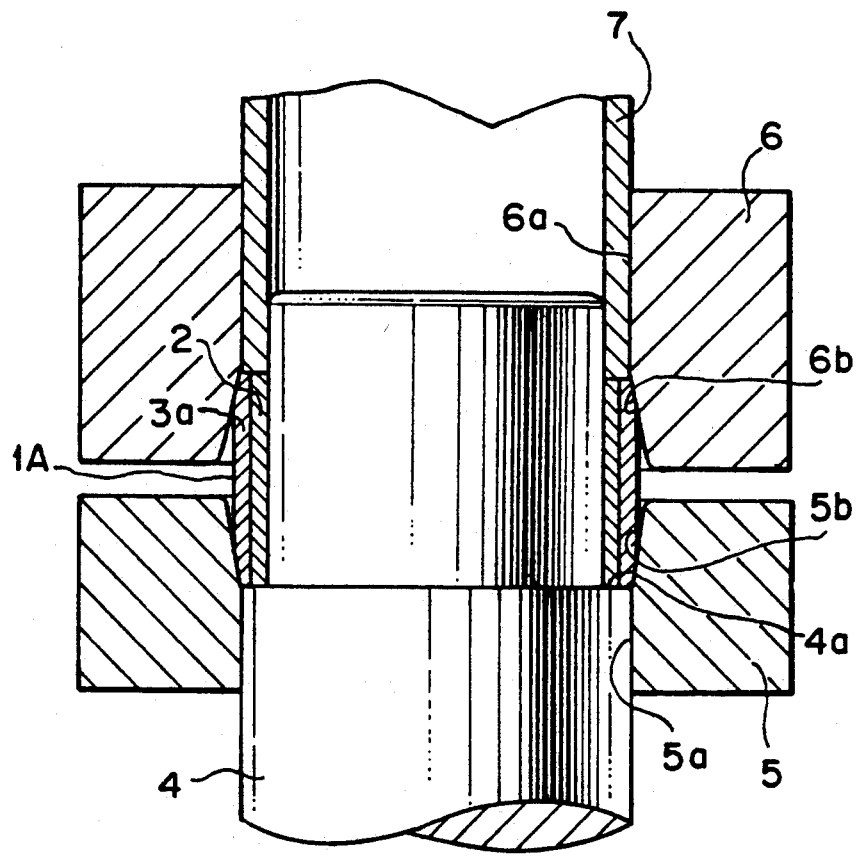
FIG. 3 is a cross-sectional view of the forming apparatus, showing a condition in which the bushing blank is bushing by upper- and lower-dies and the mandrel.
Figure 4:
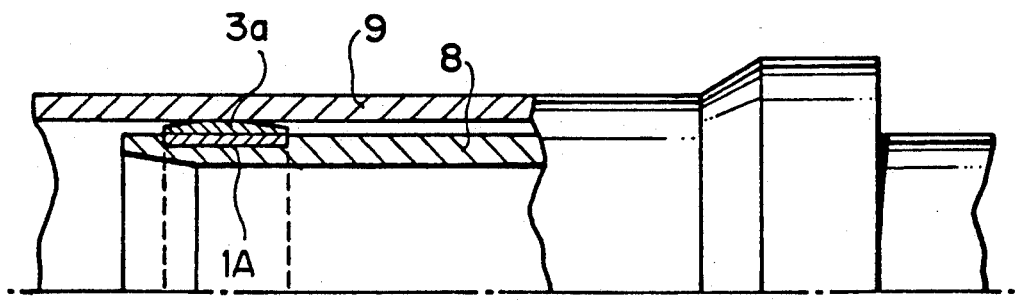
FIGS. 4 to 8 are cross-sectional views showing various kinds of bushings having their respective bearing alloy layers having different crowning shapes, each of which is mounted on an inner tube.
Figure 5:
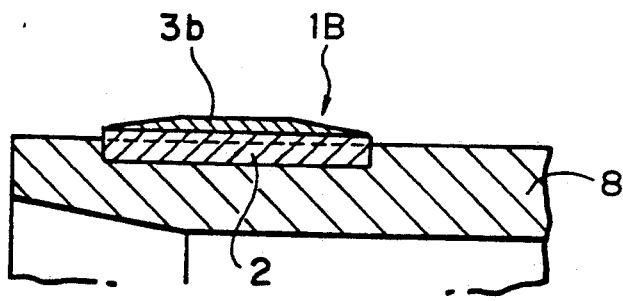
Figure 6:
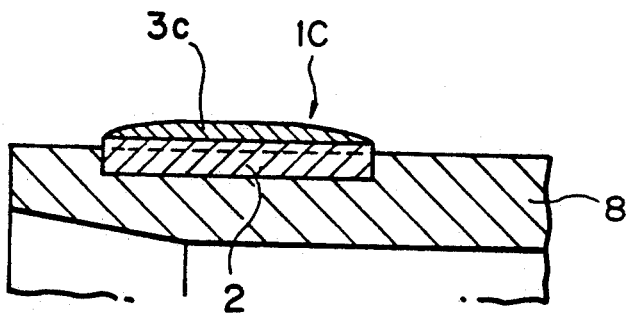
Figure 7:
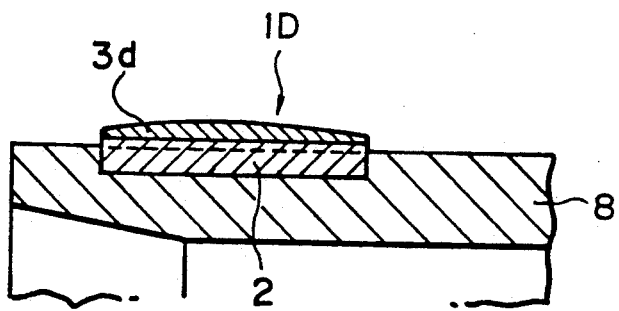
Figure 8:
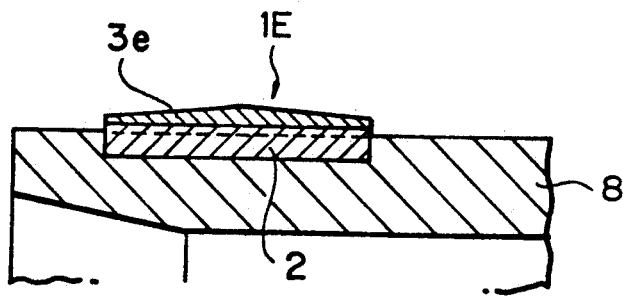

A bushing blank 1 shown in FIGS. 1 and 2 is formed by bending a blank plate into a cylindrical shape, with the opposite ends of the blank plate butted together as at A in FIG. 1. The bushing blank 1 comprises an inner backing metal 2 and an outer bearing alloy layer 3. For shaping or working the bushing blank 1, the blank 1 is first fitted on an upper end portion of a vertically-movable mandrel 4. The upper cylindrical end portion (which extends axially over a predetermined length) of the mandrel 4 is smaller in diameter than the remainder of a larger-diameter portion, and a step or shoulder 4a is provided at the boundary between the smaller- and the larger-diameter portions.

An annular lower die 5 and an annular upper die 6 arranged to be coaxial with the mandrel 4 and cooperate with the mandrel 4 for working the bushing blank 1. The lower die 5 has an inner working surface 5a which has an upper inner-surface zone 5b of frustum-conical shape flaring toward the upper end thereof and which defines a central hole of the lower die 5. The upper die 6 has also a frustum-conical lower inner surface zone 6b which is a section of an inner working surface 6a defining a central hole of the upper die and which is symmetrical with the upper inner-surface zone 5b of the lower die 5. A sleeve 7 is fitted in the central hole of the upper die 6 as to cooperate with the upper die.

The upper- and lower-dies 5 and 6 may fit on the mandrel 4. The bushing blank 1 is deformed to have a shape being equivalent to that of the space shape defined by the outer peripheral surface of the small-diameter upper end portion of the mandrel 4, the step 4a of the mandrel 4, the flaring zone 5b of the lower die 5, the flaring zone 6b of the upper die 6, and the lower end of the sleeve 7.

As shown in FIG. 2, the mandrel 4 is inserted through the central hole 5a of the lower die 5. Next, the bushing blank 1 is fitted on the smaller-diameter upper end portion of the mandrel 4. The upper die 6 moves downwards together with the sleeve 7, with the axes of the two dies 5 and 6 and the mandrel 4 aligned with one another. The bushing blank 1 is urged by the end edge of the sleeve 7, and is pressed against the step 4a of the mandrel 4. At this time, the distance between the step 4a and the lower end of the sleeve 7 does not become smaller than the initial length of the bushing blank 1. In other words, the length of the bushing blank 1 is not reduced. During this process, the bearing alloy layer 3 of the bushing blank 1 is subjected to plastic deformation, thereby imparting a crowning shape to the outer peripheral surface of the bushing blank 1, so that the outer diameter of a resultant bush 1A is smaller at its opposite end portions and increases progressively toward its central zone. Thus, there is obtained the intended bushing 1A having an outer bearing alloy layer 3a. Usually, this forming method is called "ironing".

After the above forming operation is completed, the upper die 6 is moved upwards away from the mandrel 4, and subsequently the lower die 5 is moved upwards to bring the bushing 1A to a position above the top surface of the mandrel 4. Thus the bushing 1A is removed from the mandrel 4.

The order of the steps of the working method is not limited to the above described manner, and the working may be performed in a most efficient way.

FIGS. 4 to 8 show examples of bushings each having a sliding surface at its outer periphery. Each bushing is fitted on an outer periphery of an inner tube 8, and a bearing alloy layer at the outer periphery of the bushing is held in sliding contact with an inner peripheral surface of an outer tube 9 movable fitted on the inner tube 8.

The bearing alloy layers 3b, 3c, 3d and 3e of the bushings 1B, 1C, 1D and 1E shown respectively in FIGS. 5 to 8 have respective crowning shapes slightly different from one another.

In the present invention, the bearing alloy layer of the bushing may be chamfered or curved only at the axial opposite ends of the inner peripheral surface thereof. Such configuration is also construed as a crowning shape in the present invention.

As will be apparent from the above, according to the present method of forming the outer peripheral surface of the bushing into a crowning shape, the bearing surface at the outer periphery of the bushing is formed into the crowning shape by the use of the dies, and since there is no need to remove the opposite end zones of the bushing by machining, there is no fear that chips produced by such a machining operation deposit on the sliding surface of the bushing. Furthermore, the working of the bushing may be carried out with a high productivity.

What is claimed is:

1. A bushing forming method in that a crowning shape is provided to an outer peripheral surface of a bushing comprising an outer peripheral layer and an inner backing metal layer so that the outer diameter of the bushing is smaller at its opposite longitudinal ends, and increases progressively toward a longitudinal central portion of the bushing, said outer peripheral surface serving as a sliding surface, wherein the method comprises the steps of:
   a) fitting a cylindrical bushing blank having said outer peripheral layer and said inner backing metal layer on a vertically-movable mandrel, said mandrel being coaxial with a pair of upper and lower dies with said bushing bland being situated between said upper and lower dies;
   b) moving said upper die to relatively approach said lower die, thereby plastically deforming said bushing blank and achieving said crowning shape while maintaining initial dimensions of said inner backing layer and an initial axial length of an entire said bushing blank, an inner diameter of said upper die being larger at its lower end an decreasing progressively away from said lower end, and an inner diameter of said lower die being larger at its upper end and decreasing progressively away from said upper end; and
   c) moving upper-and lower dies relative to said mandrel, thereby removing the bushing from said dies.

2. A bushing forming method according to claim 1, wherein said inner backing metal layer is of steel.

3. A bushing forming method according to claim 1, wherein said mandrel has a distal end portion which cooperates with said upper- and lower-dies to shape said cylindrical bushing blank, said distal end portion of said mandrel being smaller in diameter than another end portion thereof, said mandrel having a peripheral step provided at a boundary between said distal end portion of a smaller diameter and said another end portion of a larger diameter, and a cylindrical sleeve for cooperating with said upper die being fitted in an inner peripheral surface of said upper die.

* * * * *